United States Patent
Nakamura et al.

[11] Patent Number: 6,045,847
[45] Date of Patent: Apr. 4, 2000

[54] RICE COOKING METHOD

[75] Inventors: Akihiro Nakamura; Yoko Sato; Hiroki Narimatsu; Tomoko Kaji; Hirokazu Maeda, all of Izumisano, Japan

[73] Assignee: Fuji Oil Co., Ltd., Japan

[21] Appl. No.: 09/186,763

[22] Filed: Nov. 5, 1998

[30] Foreign Application Priority Data

| Nov. 13, 1997 | [JP] | Japan | 9-0311783 |
| Feb. 6, 1998 | [JP] | Japan | 10-025240 |
| Jun. 9, 1998 | [JP] | Japan | 10-160545 |
| Jun. 29, 1998 | [JP] | Japan | 10-181796 |

[51] Int. Cl.[7] .............. A23B 9/28; A23L 1/105; A23L 1/01; A23L 1/168
[52] U.S. Cl. .............. 426/508; 426/618; 426/52
[58] Field of Search .............. 127/29; 426/508, 426/510, 618, 629, 44, 52

[56] References Cited

U.S. PATENT DOCUMENTS

| 4,794,012 | 12/1988 | Taniguchi et al. | 426/462 |
| 4,927,660 | 5/1990 | Sano | 426/618 |
| 5,017,319 | 5/1991 | Shen | 264/124 |

FOREIGN PATENT DOCUMENTS 6-121647  5/1994  Japan .

OTHER PUBLICATIONS

Houston, D. F. *Rice: Chemistry & Technology,* pub. by Amer. Assoc. Cereal Chemists, pp. 36–37, 372–374, 383–388, 394–395, 1972.

*Primary Examiner*—Keith D. Hendricks
*Attorney, Agent, or Firm*—Wallenstein & Wagner, Ltd.

[57] ABSTRACT

A rice cooking method comprising treating polished rice with water-soluble hemicellulose. Rice of consistently good quality can be cooked in large amounts in a short time.

8 Claims, 1 Drawing Sheet

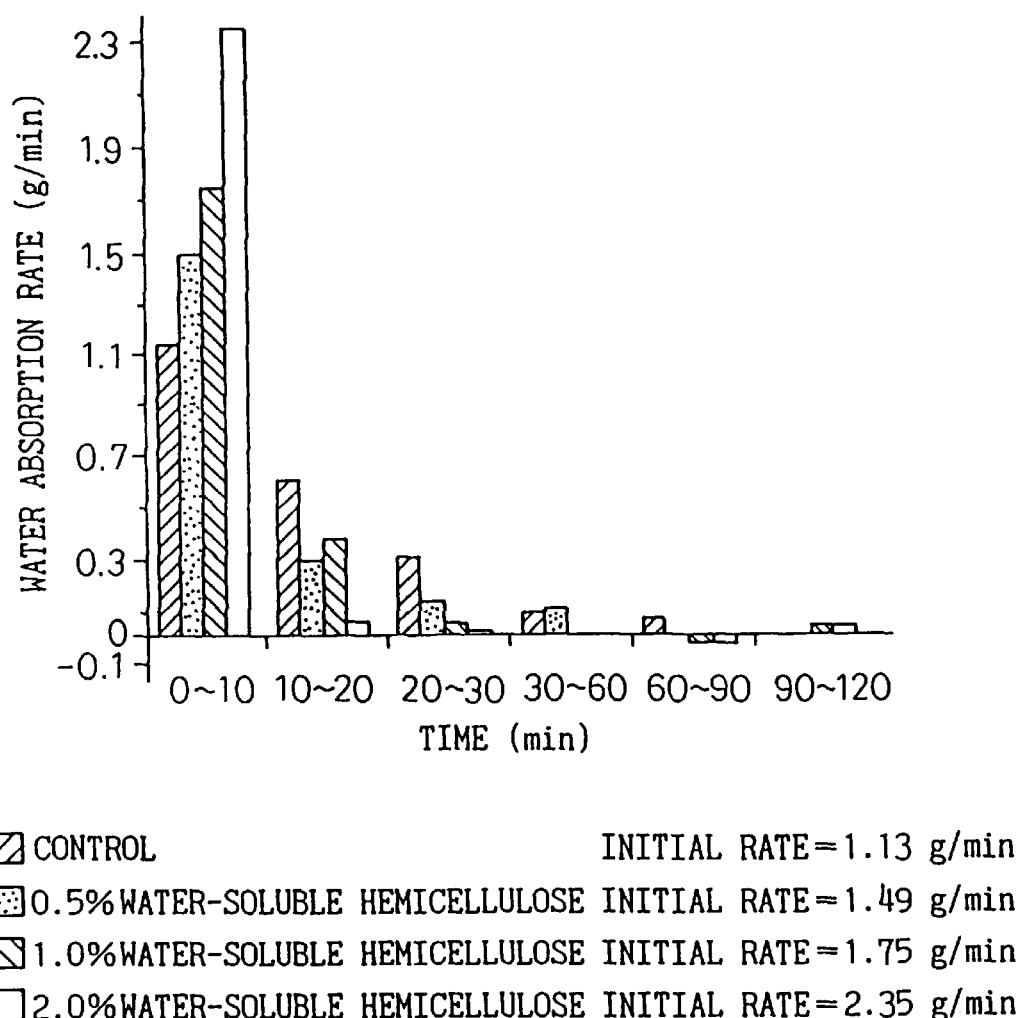

RICE COOKING METHOD

BACKGROUND OF THE INVENTION

1. Field of the Invention

The present invention relates to a rice cooking method, and more specifically it relates to a rice cooking method whereby, in the soaking step for water absorption prior to the cooking of rice, the rice is soaked in water containing water-soluble hemicellulose, or powdered water-soluble hemicellulose is sprinkled over the washed rice and mixed therewith for complete coverage after which water is added in an amount sufficient for water soaking; this method allows the soaking time to be shortened, and allows larger amounts of rice than usual to be cooked without changes in quality or texture from cooking the rice when an excess of water is added during the cooking.

2. Description of the Related Art

Rice has long been cooked in large amounts on a daily basis at restaurants for many different purposes, such as for rice balls, sushi, curry rice, bowl rice, fried rice, etc., and such cooked rice must always be of a consistent quality. For example, when nonglutinous rice is cooked, the rice can usually be obtained at a consistent quality by cooking it under prescribed conditions, but in order to obtain rice of consistent quality, by cooking under prescribed conditions after washing polished rice is usually subjected to soaking treatment in which sufficient water is added into the rice.

Specifically, when using large-scale automatic rice cookers which generally have the capacity for 500–4000 portions per hour, rice has been prepared through a series of steps comprising a step of washing polished rice (stored rice), a step of soaking the washed rice in water, a step of draining the soaked rice and a step of adding cooking water to the drained rice, followed by a step of rice cooking and a step of steaming; however, traditionally it has been necessary for the washed polished rice (hereunder also referred to as "washed rice") to be combined with an equivalent or an excess of water for soaking of the washed rice. Depending on the type of rice, the washed rice can usually absorb from 1.25 to 1.30 times its weight in water, and this has necessitated a very long period of 1.5 to 3.0 hours for soaking, thus constituting the greater part of the preparation time from polished rice to cooked rice. This has made it difficult to lower preparation costs and resulted in very poor operating efficiency.

For steamed rice with red beans (okowa) it is common to use glutinous rice alone or glutinous rice in admixture with nonglutinous rice, but sufficient absorption of water by glutinous rice usually requires soaking overnight, and thus the working time is longer than for nonglutinous rice. Consequently, it is impossible to satisfy unexpected orders, and early preparation is particularly necessary for year-end rice cakes, making it very difficult to deal with any sudden orders. For this reason, modifications have been made to the mechanical working steps in order to shorten the soaking time, such as adjustment of the soaking temperature, or subjection to reduced pressure for rapid permeation of water into the rice; however, when the soaking temperature is raised in order to increase water absorption efficiency, swelling of the starch particles leads to rupture of the starch particles during the cooking stage after soaking, so that the shape of the rice grains cannot be maintained and the rice tends to stick together. Also, when the soaking is carried out under reduced pressure, there is a risk of cracking (splitting) of the rice grains, whereby the rice grains are destroyed and the quality of the cooked rice is impaired.

For commercial mass preparation of rice, a simple method is also employed using pregelatinized rice wherein a portion of the starch has been gelatinized by first heating polished rice with water vapor in order to eliminate the soaking step; however, such rice is generally expensive, and increases the preparation costs for large-scale commercial rice cooking. Also, since pregelatinized rice has a high moisture content prior to cooking, it has poor storage qualities and the texture of the cooked rice is notably impaired when it is stored for long periods, so that it is not practical as rice for convenience stores and the like where rice is kept for extended periods prior to sale.

In addition, when the rice is cooked using an excess of water with respect to the rice, the rice grains are destroyed and the characteristic light stickiness and elasticity of the rice is lost, giving it a heavy stickiness. If instead the amount of water is reduced the starchy grains of the rice cannot be fully gelatinized, producing hard, non-sticky rice which has lost all value as a food product. Consequently, while the amount of water used during cooking cannot be generally standardized due to the differences in rice types and rice age, it is normal to cook rice with an amount of water most suited to the type of rice and the conditions for the rice cooking, and rarely is rice cooked with larger amounts of water added for the purpose of improving rice yields, that is, with the rice cooked in an excess amount of water to increase the volume of the rice.

SUMMARY OF THE INVENTION

It is an object of the present invention to provide a rice cooking method whereby large amounts of rice of consistent quality can be cooked in a short time and simple manner, and whereby larger amounts of rice than usual can be cooked without changes in quality or texture resulting from cooking the rice with excess water added during the cooking.

As a result of diligent research in light of the problems described above, the present inventors have found that by adding water-soluble hemicellulose to soaking water for polished rice, during the process in which the polished rice is washed, soaked in water, drained and then cooked after addition of water, it is possible to accomplish absorption of water by the rice in a short time with an amount of water for which absorption has traditionally taken a longer time; i.e., water-soluble hemicellulose is effective as a soaking time-shortening agent which can shorten the time in which rice absorbs water.

Moreover, water-soluble hemicellulose is also effective as a yield-improving agent, which can increase the volume of rice resulting from cooking without causing a change in texture even when an excess of water is added during the cooking as a result of the addition of the water-soluble hemicellulose.

It has also been found that when rice cooked with addition of water-soluble hemicellulose is stored at low temperatures of 10° C. or below, in the so-called chilled temperature range, deterioration in the quality of the rice due to aging and hardening of its starch is inhibited, allowing a satisfactory texture to be maintained over longer periods. The present invention has been completed on the basis of these findings.

In other words, the present invention provides a rice cooking method comprising treating polished rice with water-soluble hemicellulose.

Water-soluble hemicellulose has conventionally been added mainly as dietary fiber to foods and antiflatulents, and has also been utilized for stabilization of lactoprotein beverages, for constitutional improvement (softening) of bakery products, for applications in the field of adhesives, for production of edible films, in combination with gelating agents to inhibit gelation, and for improvement in the degradation properties of processed grain foods.

However, it has been completely unknown to this date that addition of water-soluble hemicellulose to rice in the soaking step for rice cooking shortens the soaking time, increases the amount of water permeating the rice to give a greater volume of rice after cooking, and prevents deterioration in rice quality by aging, hardening, etc. even when it is stored in the chilled temperature range.

BRIEF DESCRIPTION OF THE DRAWING

FIG. 1 is a graph showing the changes in weight per unit of water absorption time calculated as the water absorption rate, based on periodical measurements of degrees of increasing weights by soaking for Control Example 1 and Examples 1 to 3, and here it is seen that higher water absorption rates result in greater amounts of water absorption per unit of time.

DESCRIPTION OF THE PREFERRED EMBODIMENTS

Water-soluble hemicellulose of any molecular weight may be used, but a high molecular weight product is preferably used, having an average molecular weight of a few thousand to a few million, and specifically from 5000 to 1,000,000. If the molecular weight is too high the viscosity will rise excessively resulting in poor manageability. The average molecular weight of the water-soluble hemicellulose is the value as determined by the limiting viscosity method where the viscosity is measured in a 0.1 molar $NaNO_3$ solution with pullulan (Showa Denko, KK.) as the standard substance. The uronic acid was measured by the Blumenkrant method, and the neutral sugars were measured by the GLC method after alditol acetate conversion.

The water-soluble hemicellulose is either obtained by water extraction from a hemicellulose-containing starting material, or if necessary heat elution under acid or alkali conditions, or it may be eluted by decomposition with an enzyme. The following is an example of a method for producing water-soluble hemicellulose.

First, suitable plant-derived starting materials to be used include the husks of oily seeds of soybean, palm, coconut, corn or cottonseed with the oil and protein removed, and lees from grains such as rice or wheat and roots such as beets with the starch or sugar removed. When the starting material is soybean, the okara (bean-curd refuse) may be used as a by-product from preparation of tofu (bean curd), soybean milk or separated soybean protein.

The water-soluble hemicellulose of the invention is preferred to be derived from beans, and particularly from soybean, especially from the cotyledon thereof. The protein content of the soybean hemicellulose is preferred to be as low as possible and specifically preferred to be no higher than 12 wt %, particularly no higher than 8 wt %.

These starting materials may be subjected to heat decomposition at a temperature preferably of from 80° C. to 130° C., and more preferably from 100° C. to 130° C., under either acidic or alkali conditions but preferably at a pH near the isoelectric point of each protein, and after fractionation of the water-soluble fraction, it may be dried directly or subjected to activated carbon treatment, resin adsorption treatment or ethanol precipitation to remove the hydrophobic substances or low molecular substances, and then dried to yield the water-soluble polysaccharide. Decomposition extraction may also be carried out with hemicellulase or pectinase.

This water-soluble hemicellulose is a polysaccharide containing galactose, arabinose, xylose, fucose, rhamnose and galacturonic acid as constituent saccharides. A detailed analysis of the constituents of water-soluble hemicellulose as obtained by hydrolysis may be found in Japanese Unexamined Patent Publication No. 4-325058.

According to the present invention, the water-soluble hemicellulose may be used alone or in an emulsified state with a fat or oil to achieve the function of producing a shorter soaking time and allowing a greater amount of water to permeate the rice, but other quality enhancers or additives may also be combined therewith as deemed suitable. As other quality enhancers and additives there may be mentioned emulsifiers such as lecithin and glycerin fatty acid esters, sucrose fatty acid esters, etc.; oily substances including common animal and vegetable oils and the oil-soluble vitamin tocopherol; saccharides such as sucrose, maltose and trehalose; polysaccharides and their polysaccharide hydrolysates, including sugar alcohol, dextrin, glue plant (funori), agar, carrageenan, furcellaran, tamarind seed polysaccharides, angelica gum, karaya gum, pectin, xanthan gum, sodium alginate, tragacanth gum, guar gum, locust bean gum, pullulan, jellan gum, gum arabic, hyaluronic acid, cyclodextrin, chitosan, carboxymethylcellulose (CMC), propylene glycol alginate ester and processed starch and other starches; proteinaceous substances such as gelatin, whey and other albumins, casein sodium, soluble collagen, egg white, egg yolk, soybean protein, etc.; bases such as calcium reinforcers; and pH adjusters such as sodium acetate. Thus, the soaking time-shortening agent for grain preparation according to the present invention may be distributed and sold not only in the form of a powder, but also in emulsified or suspended form with a fat or oil, or in solution form in water, saline or a solution of an organic acid such as acetic acid.

According to the invention, one of the methods of treating the polished rice with the water-soluble hemicellulose is to prepare an aqueous solution in the soaking water used to soak the washed rice, or to add it as a powder for dissolution or dispersion in the soaking water, or to add it directly as a powder to the washed rice and mix it so as to cover all of the rice, or to spray it onto the washed rice as a dispersion in an aqueous solution or alcohol, and then add the water thereto for soaking.

The amount of the water-soluble hemicellulose to be added to the soaking water is not particularly restricted, but a generally preferred range for the concentration in the soaking water is 0.01 wt % to 10 wt %, and preferably 0.05 wt % to 5 wt %.

The amount of water used for soaking cannot be prescribed for all cases as it will depend on the type or age of the rice, but an amount of ½ to 10 times the amount of washing water may be suitable. The soaking time cannot be prescribed for all cases since it will depend on the season, temperature, amount of water and the type and age of the rice, but if the usual soaking time is 2 hours, it may be shortened to about 25 minutes or one hour, i.e. to about ⅕ to ½ of the normal soaking time.

Another method for treating polished rice with the water-soluble hemicellulose is to cook the washed rice in water to which the water-soluble hemicellulose has been added. There are no particular restrictions on the timing for addition of the water-soluble hemicellulose, and it may be predissolved in the water which is mixed with the washed rice, or added just prior to cooking.

The amount of the water-soluble hemicellulose to be added is not particularly restricted, but is preferably in the range of 0.01 wt % to 10 wt % and more preferably 0.05 wt % to 5 wt %, with respect to the rice (in terms of dry weight).

The amount of water cannot be specified for all cases since it will depend on the type or age of the rice, but it may be experimentally determined beforehand for a moisture content in the rice of 55 wt % to 75 wt %, preferably 57–70 wt % and more preferably 60–65 wt % at about 30 minutes after cooking. The rice according to the invention is characterized by having a higher moisture content than conventional rice, and the corresponding moisture content for conventional rice is about 53 wt %.

The present invention will now be further explained by way of examples, which however are not intended to restrict the invention. Throughout the examples, "parts" and "%" are both based on weight.

The water-soluble hemicellulose used was prepared in the following manner.

To raw okara obtained from production of separated soybean protein there was added a two-fold amount of water, and after adjustment to pH 4.5 with hydrochloric acid, the mixture was heated at 120° C. for 1.5 hours and subjected to heat extraction. After cooling, the mixture was centrifuged (10,000 G×30 min) and the supernatant and precipitate were separated. An equivalent weight of water was added to the separated precipitate, and after repeating centrifugation, the supernatant was combined with the previous supernatant and passed through an activated carbon column, and then subjected to purification and dried to prepare water-soluble soybean hemicellulose.

For the examples, washed rice was soaked by the method described below and periodically drained to prepare soaked rice, and then the weight and moisture content of the rice were measured. In all of the examples, the moisture contents are the values measured after draining, that is, removing the excess water from the rice through a basket and leaving it in the basket for 10 minutes, and then taking 10 g of rice and drying it at 105° C. for 4 hours.

CONTROL EXAMPLE 1

To 100 g of washed rice there was added 300 g of water (3 times the amount of rice). Soaked rice samples were prepared which had stood for 10 minutes, 20 minutes, 60 minutes and 120 minutes after soaking.

Example 1

Soaked rice was prepared in exactly the same manner as Control Example 1, except that 1.5 g of the water-soluble hemicellulose prepared in the manner described above was added and dissolved in water to prepare an aqueous solution (0.5% solution) for soaking of the washed rice.

Example 2

Soaked rice was prepared in exactly the same manner as Control Example 1, except that 3.0 g of the water-soluble hemicellulose was added and dissolved in water to prepare an aqueous solution (1.0% solution) for soaking of the washed rice.

Example 3

Soaked rice was prepared in exactly the same manner as Control Example 1, except that 6.0 g of the water-soluble hemicellulose was added and dissolved in water to prepare an aqueous solution (2.0% solution) for soaking of the washed rice.

Tables 1 and 2 show the summarized results for weight changes in the soaked rice (increase in weight of soaked rice after soaking with respect to weight of washed rice before soaking) and increases in moisture content (increase in moisture content of soaked rice with respect to moisture content of washed rice before soaking), as calculated from periodic measurements.

TABLE 1

Weight change of rice by soaking

| | Water-soluble hemicellulose concentration of soaking water (wt %) | | | | | | | | | | | | | | | | | | | |
|---|---|---|---|---|---|---|---|---|---|---|---|---|---|---|---|---|---|---|---|---|
| | 0% | | | | | 0.5% | | | | | 1.0% | | | | | 2.0% | | | | |
| Time(min) | 0 | 10 | 20 | 60 | 120 | 0 | 10 | 20 | 60 | 120 | 0 | 10 | 20 | 60 | 120 | 0 | 10 | 20 | 60 | 120 |
| Control Ex. 1 | 0 | 12 | 14 | 23 | 24 | | | | | | | | | | | | | | | |
| Example 1 | | | | | | 0 | 17 | 21 | 21 | 21 | | | | | | | | | | |
| Example 2 | | | | | | | | | | | 0 | 16 | 20 | 22 | 23 | | | | | |
| Example 3 | | | | | | | | | | | | | | | | 0 | 23 | 23 | 23 | 22 |

TABLE 2

Moisture increase of rice by soaking

| | Water-soluble hemicellulose concentration of soaking water (wt %) | | | | | | | | | | | | | | | | | | | |
|---|---|---|---|---|---|---|---|---|---|---|---|---|---|---|---|---|---|---|---|---|
| | 0% | | | | | 0.5% | | | | | 1.0% | | | | | 2.0% | | | | |
| Time(min) | 0 | 10 | 20 | 60 | 120 | 0 | 10 | 20 | 60 | 120 | 0 | 10 | 20 | 60 | 120 | 0 | 10 | 20 | 60 | 120 |
| Control Ex. 1 | 0 | 7 | 8 | 9 | 9 | | | | | | | | | | | | | | | |
| Example 1 | | | | | | 0 | 7 | 10 | 13 | 12 | | | | | | | | | | |
| Example 2 | | | | | | | | | | | 0 | 13 | 13 | 13 | 12 | | | | | |
| Example 3 | | | | | | | | | | | | | | | | 0 | 12 | 13 | 13 | 13 |

The results in Table 1 show that soaking of the washed rice resulted in an increase of about 21% to 24% in the rice weight at a constant rate. The time until this constant rate was reached was from 60 to 90 minutes for the control example, whereas in Examples 1–3 in which the water-soluble hemicellulose was added, the time was 20 minutes in Example 1 in which the water-soluble hemicellulose was added at 0.5% and Example 2 in which it was added at 1.0%, and 10 minutes in Example 3 in which it was added at 2.0%, showing that the constant rate was reached in a shorter time. Thus, addition of the water-soluble hemicellulose during the soaking resulted in a marked shortening of the soaking time.

Also, the results in Table 2 show that soaking of the washed rice resulted in an increase of about 10% to 13% in the moisture content of the rice at a constant rate. While the control product of the control example with no additive had about a 10% increase in moisture content even with 2 hours of water absorption, the examples in which water-soluble hemicellulose was added clearly had a greater amount of water in the rice, and clearly contained the same amount of water regardless of the amount added (3% increase over the rice soaked in water). Also, the time until the increase in moisture became constant was about 60 minutes in the control example, whereas in Examples 1–3 in which the water-soluble hemicellulose was added, the time was about 20 minutes in Example 1 in which the water-soluble hemicellulose was added at 0.5% and about 10 minutes in Example 2 in which it was added at 1.0% and Example 3 in which it was added at 2.0%, showing that the constant rate was reached in a shorter time. Thus, addition of the water-soluble hemicellulose during the soaking resulted in a larger amount of water absorption in the interior and surface of the rice in a short time, paralleling the previous results for weight increase by soaking.

The water absorption rates by soaking of washed rice are summarized in FIG. 1, which is a graph of the changes in weight of the washed rice after soaking for various times of 0–10 minutes, 10–20 minutes, 20–30 minutes, 30–60 minutes, 60–90 minutes and 90–120 minutes in the water or water-soluble hemicellulose solution.

The initial water absorption rate, which was considered to be the water absorption rate from the start of soaking to 10 minutes afterward, was 1.13 g/min in the control example, compared to 1.49 g/min in Example 1, 1.75 g/min in Example 2 and 2.35 g/min in Example 3, all of which were higher values than the control example, indicating higher water absorption rates.

In the following examples, rice was cooked using soaked rice prepared by the method used for Control Example 1 and Examples 1 to 3, with storage at 10° C. and 20° C. for 48 hours. The taste of the stored rice was periodically evaluated by organoleptic evaluation and taste analysis. The organoleptic evaluation was conducted with a panel of 20 evaluators, and the taste values were determined using a rice cooker taste analyzer, model STA1A by Satake Works, KK.

CONTROL EXAMPLE 2

After adding 320 g of water to 320 g of soaked rice which had been soaked for 10 minutes or 120 minutes by the method of Control Example 1, the rice was cooked using a domestic rice cooker (Micon Rice Cooker model ECJ-EA18, product of Sanyo Denki, KK.). A 100 g portion was divided out into a plastic container and wrapped to prevent drying, and then placed in an incubator at 10° C. or 20° C. for storage for 48 hours.

Example 4

Rice was cooked in exactly the same manner as Control Example 2, except that the soaked rice used was prepared by the method of Example 1. A 100 g portion was divided out into a plastic container and wrapped to prevent drying, and then placed in an incubator at 10° C. or 20° C. for storage for 48 hours.

Example 5

Rice was cooked in exactly the same manner as Control Example 2, except that the soaked rice used was prepared by the method of Example 2. A 100 g portion was divided out into a plastic container and wrapped to prevent drying, and then placed in an incubator at 10° C. or 20° C. for storage for 48 hours.

Example 6

Rice was cooked in exactly the same manner as Control Example 2, except that the soaked rice used was prepared by the method of Example 3. A 100 g portion was divided out into a plastic container and wrapped to prevent drying, and then placed in an incubator at 10° C. or 20° C. for storage for 48 hours.

Example 7

Rice was cooked in exactly the same manner as Example 4, except that the amount of water used for cooking was 384 g (1.2 times the amount of soaking water). A 100 g portion was divided out into a plastic container and wrapped to prevent drying, and then placed in an incubator at 10° C. or 20° C. for storage for 48 hours.

Example 8

Rice was cooked in exactly the same manner as Example 5, except that the amount of water used for cooking was 384 g (1.2 times the amount of soaking water). A 100 g portion was divided out into a plastic container and wrapped to prevent drying, and then placed in an incubator at 10° C. or 20° C. for storage for 48 hours.

Example 9

Rice was cooked in exactly the same manner as Example 6, except that the amount of water used for cooking was 384 g (1.2 times the amount of soaking water). A 100 g portion was divided out into a plastic container and wrapped to prevent drying, and then placed in an incubator at 10° C. or 20° C. for storage for 48 hours.

The results of the organoleptic evaluation of the rice are summarized in Tables 3 and 4. The texture of the rice is indicated in order of quality by the symbols ⊙ (very good), ○ (good), Δ (slightly poor) and X (poor), based on the 2-hour soaked rice of Control Example 2 as reference.

TABLE 3

Taste changes in white rice under different soaking conditions (organoleptic eval.: storage at 10° C.)

| | Water-soluble hemicellulose concentration of soaking water (wt %) | | | | | | | | | | | | | | | | | | | | | | | |
|---|---|---|---|---|---|---|---|---|---|---|---|---|---|---|---|---|---|---|---|---|---|---|---|---|
| | 0% | | | | | | 0.5% | | | | | | 1.0% | | | | | | 2.0% | | | | | |
| Soaking time(min) | 10 | | | 120 | | | 10 | | | 120 | | | 10 | | | 120 | | | 10 | | | 120 | | |
| Storage time(hrs) | 0 | 24 | 48 | 0 | 24 | 48 | 0 | 24 | 48 | 0 | 24 | 48 | 0 | 24 | 48 | 0 | 24 | 48 | 0 | 24 | 48 | 0 | 24 | 48 |
| Control Ex. 2 | Δ | X | X | ○ | X | X | | | | | | | | | | | | | | | | | | |
| Example 4 | | | | | | | ○ | Δ | X | ○ | Δ | X | | | | | | | | | | | | |
| Example 5 | | | | | | | | | | | | | ○ | Δ | X | ○ | Δ | Δ | | | | | | |
| Example 6 | | | | | | | | | | | | | | | | | | | ○ | Δ | X | ○ | Δ | Δ |
| Example 7 | | | | | | | ○ | ○ | X | ○ | ○ | Δ | | | | | | | | | | | | |
| Example 8 | | | | | | | | | | | | | ⊙ | ○ | X | ⊙ | ○ | Δ | | | | | | |
| Example 9 | | | | | | | | | | | | | | | | | | | ⊙ | ○ | Δ | ⊙ | ○ | Δ |

TABLE 4

Taste changes in white rice under different soaking conditions (organoleptic eval.: storage at 20° C.)

| | Water-soluble hemicellulose concentration of soaking water (wt %) | | | | | | | | | | | | | | | | | | | | | | | |
|---|---|---|---|---|---|---|---|---|---|---|---|---|---|---|---|---|---|---|---|---|---|---|---|---|
| | 0% | | | | | | 0.5% | | | | | | 1.0% | | | | | | 2.0% | | | | | |
| Soaking time(min) | 10 | | | 120 | | | 10 | | | 120 | | | 10 | | | 120 | | | 10 | | | 120 | | |
| Storage time(hrs) | 0 | 24 | 48 | 0 | 24 | 48 | 0 | 24 | 48 | 0 | 24 | 48 | 0 | 24 | 48 | 0 | 24 | 48 | 0 | 24 | 48 | 0 | 24 | 48 |
| Control Ex. 2 | Δ | Δ | X | ○ | Δ | X | | | | | | | | | | | | | | | | | | |
| Example 4 | | | | | | | ○ | ○ | X | ○ | ○ | Δ | | | | | | | | | | | | |
| Example 5 | | | | | | | | | | | | | ○ | ○ | Δ | ○ | ○ | ○ | | | | | | |
| Example 6 | | | | | | | | | | | | | | | | | | | ○ | ○ | ○ | ○ | ○ | ○ |
| Example 7 | | | | | | | ○ | ○ | ○ | ○ | ○ | Δ | | | | | | | | | | | | |
| Example 8 | | | | | | | | | | | | | ⊙ | ○ | Δ | ⊙ | ⊙ | ○ | | | | | | |
| Example 9 | | | | | | | | | | | | | | | | | | | ⊙ | ○ | ○ | ⊙ | ⊙ | ○ |

The taste immediately after cooking was judged to be virtually the same whether the rice was cooked from soaked rice prepared by soaking for only 10 minutes with soybean-derived hemicellulose added during the soaking step, or from soaked rice with a soaking time of 120 minutes. Also, even after extended storage at 10° C., the soybean-derived hemicellulose-added rice maintained satisfactory texture with no hardening of the rice grains. On the other hand, the rice obtained by cooking the soaked rice prepared by soaking in water for 10 minutes was still slightly half-cooked, and the texture during storage was also poorer.

The taste analysis values for the rice are summarized in Tables 5 and 6. The taste analysis values are based on a total score of 100 points, with a higher score indicating better texture and taste.

TABLE 5

Taste changes in white rice under different soaking conditions (organoleptic eval.: storage at 10° C.)

| | Water-soluble hemicellulose concentration of soaking water (wt %) | | | | | | | | | | | | | | | | | | | | | | | |
|---|---|---|---|---|---|---|---|---|---|---|---|---|---|---|---|---|---|---|---|---|---|---|---|---|
| | 0% | | | | | | 0.5% | | | | | | 1.0% | | | | | | 2.0% | | | | | |
| Soaking time(min) | 10 | | | 120 | | | 10 | | | 120 | | | 10 | | | 120 | | | 10 | | | 120 | | |
| Storage time(hrs) | 0 | 24 | 48 | 0 | 24 | 48 | 0 | 24 | 48 | 0 | 24 | 48 | 0 | 24 | 48 | 0 | 24 | 48 | 0 | 24 | 48 | 0 | 24 | 48 |
| Control Ex. 2 | 52 | 35 | 30 | 71 | 47 | 35 | | | | | | | | | | | | | | | | | | |
| Example 4 | | | | | | | 73 | 55 | 42 | 74 | 61 | 51 | | | | | | | | | | | | |
| Example 5 | | | | | | | | | | | | | 74 | 57 | 46 | 73 | 60 | 50 | | | | | | |
| Example 6 | | | | | | | | | | | | | | | | | | | 72 | 61 | 49 | 76 | 62 | 52 |
| Example 7 | | | | | | | 76 | 67 | 55 | 77 | 67 | 55 | | | | | | | | | | | | |
| Example 8 | | | | | | | | | | | | | 75 | 64 | 57 | 77 | 66 | 59 | | | | | | |
| Example 9 | | | | | | | | | | | | | | | | | | | 76 | 65 | 56 | 74 | 67 | 60 |

TABLE 6

Taste changes in white rice under different soaking conditions (organoleptic eval.: storage at 20° C.)

| | Water-soluble hemicellulose concentration of soaking water (wt %) | | | | | | | | | | | | | | | | | | | | | | | |
|---|---|---|---|---|---|---|---|---|---|---|---|---|---|---|---|---|---|---|---|---|---|---|---|---|
| | 0% | | | | | | 0.5% | | | | | | 1.0% | | | | | | 2.0% | | | | | |
| Soaking time(min) | 10 | | | 120 | | | 10 | | | 120 | | | 10 | | | 120 | | | 10 | | | 120 | | |
| Storage time(hrs) | 0 | 24 | 48 | 0 | 24 | 48 | 0 | 24 | 48 | 0 | 24 | 48 | 0 | 24 | 48 | 0 | 24 | 48 | 0 | 24 | 48 | 0 | 24 | 48 |
| Control Ex. 2 | 52 | 45 | 35 | 71 | 69 | 58 | | | | | | | | | | | | | | | | | | |
| Example 4 | | | | | | | 73 | 64 | 59 | 74 | 66 | 62 | | | | | | | | | | | | |
| Example 5 | | | | | | | | | | | | | 74 | 65 | 56 | 73 | 64 | 58 | | | | | | |
| Example 6 | | | | | | | | | | | | | | | | | | | 72 | 62 | 57 | 76 | 68 | 58 |
| Example 7 | | | | | | | 76 | 68 | 62 | 77 | 68 | 63 | | | | | | | | | | | | |
| Example 8 | | | | | | | | | | | | | 75 | 68 | 62 | 77 | 68 | 63 | | | | | | |
| Example 9 | | | | | | | | | | | | | | | | | | | 76 | 68 | 61 | 74 | 68 | 63 |

The cooked rice prepared from rice to which soybean-derived hemicellulose was added during soaking exhibited a lower loss of taste with the passage of time even when stored at 10° C. While the additive-free products lost their stickiness and became loose with passing time when stored at 10° C. or 20° C., the water-soluble hemicellulose-added products of Examples 7 to 9 prepared with a greater amount of water during cooking retained their stickiness even when stored at 10° C. or 20° C., and kept a satisfactory rice texture with no hardness.

Examples 10–13

Rice was cooked by the method described below for a comparison of the moisture contents and textures at 30 minutes after cooking. In all of the examples, the moisture contents are the values measured at 30 minutes after cooking, taking 10 g of rice and drying it at 105° C. for 4 hours.

CONTROL EXAMPLE 3 (comparison with Control Example 2)

After adding 320 g of water to 320 g of soaked rice (equal amount with respect to the rice), the rice was cooked using a domestic rice cooker (Micon Rice Cooker model ECJ-EA18, product of Sanyo Denki, KK.).

CONTROL EXAMPLE 4

Rice was cooked in exactly the same manner as Control Example 3, except that the amount of water added for cooking was 384 g (1.2 times the amount of rice).

CONTROL EXAMPLE 5

Rice was cooked in exactly the same manner as Control Example 3, except that the amount of water added for cooking was 480 g (1.5 times the amount of rice).

Example 10

Rice was cooked in exactly the same manner as Control Example 4, except that 0.64 g of the water-soluble hemicellulose prepared above (0.2% with respect to the rice) was added and dissolved in the water.

Example 11

Rice was cooked in exactly the same manner as Control Example 4, except that 1.6 g of the water-soluble hemicellulose (0.5% with respect to the rice) was added and dissolved in the water.

Example 12

Rice was cooked in exactly the same manner as Control Example 5, except that 0.64 g of the water-soluble hemicellulose prepared above (0.2% with respect to the rice) was added and dissolved in the water.

Example 13

Rice was cooked in exactly the same manner as Control Example 5, except that 1.6 g of the water-soluble hemicellulose (0.5% with respect to the rice) was added and dissolved in the water.

Example 14

Rice was cooked in the same manner by adding 576 g of water to 320 g of rice (1.8 times the amount of rice) and adding 1.6 g of water-soluble hemicellulose (0.5% with respect to the rice) to the water.

The moisture contents and textures of the rice are summarized in Table 7. The texture of the rice is indicated in order of quality by the symbols ⊚ (very good), ○ (good), Δ (slightly poor) and X (poor), based on Control Example 3 as reference.

addition increased to 1.8 times the amount of rice during cooking, also giving a yield of 42.5%.

Comparative Examples 1–4

Rice was cooked according to the method described below to determine whether any difference in yield increase was obtained with different polysaccharides. In all of the examples, the moisture contents are the values measured at 30 minutes after cooking, taking 10 g of rice and drying it at 105° C. for 4 hours.

Comparative Example 1

Rice was cooked in exactly the same manner as Example 13, except that 1.6 g of gum arabic (0.5% with respect to the rice) was added instead of the water-soluble hemicellulose.

Comparative Example 2

Rice was cooked in exactly the same manner as Example 13, except that 1.6 g of pectin (0.5% with respect to the rice) was added instead of the water-soluble hemicellulose.

Comparative Example 3

Rice was cooked in exactly the same manner as Example 13, except that 1.6 g of maltodextrin (0.5% with respect to the rice) was added instead of the water-soluble hemicellulose.

TABLE 7

Rice moisture contents and textures

| Water added | Water-soluble hemicellulose added (wt % with respect to rice) | | | | | | | | |
|---|---|---|---|---|---|---|---|---|---|
| (comparative | 0% | | | 0.2% | | | 0.5 | | |
| amount with respect to rice) | Moisture (%) | Texture | Yield (%) | Moisture (%) | Texture | Yield (%) | Moisture (%) | Texture | Yield (%) |
| Control Ex. 3 (1.0) | 53.0 | ⊚ | 100 | | | | | | |
| Control Ex. 4 (1.2) | 56.2 | Δ | 112 | | | | | | |
| Control Ex. 5 (1.5) | 61.3 | X | 124 | | | | | | |
| Example 10 (1.2) | | | | 55.9 | ⊚ | 108.9 | | | |
| Example 11 (1.2) | | | | | | | 56.8 | ⊚ | 113.8 |
| Example 12 (1.5) | | | | 60.7 | ○ | 118.1 | | | |
| Example 13 (1.5) | | | | | | | 60.4 | ⊚ | 125.3 |
| Example 14 (1.8) | | | | | | | 71.2 | ⊚ | 142.5 |

Note:
Yields shown are the yields after cooking, with 100% as the amount of rice obtained after cooking in Control Example 3.

The above results demonstrate that addition of water-soluble hemicellulose at 0.5% with respect to the rice provided roughly the same texture as when the rice was cooked with an equivalent amount of water, even though water was increased to 1.5 times the amount of rice during cooking. Also, the yield in Example 13 was even 25.3% higher than that of Control Example 3, without impairing the characteristic texture of the rice. The rice grains readily crumbled in Control Example 5 in which no water-soluble hemicellulose was added, while the grains of Example 13 were about as firm as those of Control Example 3 or Control Example 4, and satisfactory rice was also obtained in Example 14 in which the rice was cooked with the water

Comparative Example 4

Rice was cooked in exactly the same manner as Example 13, except that 1.6 g of xanthan gum (0.5% with respect to the rice) was added instead of the water-soluble hemicellulose.

The moisture contents and textures of the rice are summarized in Table 8. The texture of the rice is indicated in order of quality by the symbols ⊚ (very good), ○ (good), Δ (slightly poor) and X (poor), based on Control Example 3 as reference.

TABLE 8

Rice moisture contents and textures

| Water added (comparative amount with respect to rice) | Water-soluble hemicellulose added (wt % with respect to rice) | | | | | |
|---|---|---|---|---|---|---|
| | 0% | | | 0.5 | | |
| | Moisture (%) | Texture | Yield (%) | Moisture (%) | Texture | Yield (%) |
| Control Ex. 3 (1.0) | 53.0 | ⊚ | 100 | | | |
| Control Ex. 5 (1.5) | 61.3 | X | 124 | | | |
| Example 13 (1.5) | | | | 60.4 | ⊚ | 125.3 |
| Comp. Example 1 (1.5) | | | | 59.9 | X | 128.9 |
| Comp. Example 2 (1.5) | | | | 60.8 | Δ | 123.3 |
| Comp. Example 3 (1.5) | | | | 61.4 | X | 128.7 |
| Comp. Example 4 (1.5) | | | | 61.9 | X | 125.1 |

Note:
Yields shown are the yields after cooking, with 100% as the amount of rice obtained after cooking in Control Example 3.

As shown in the table, no improvement in yield was obtained when polysaccharides other than water-soluble hemicellulose were added to the rice. In terms of texture, heavy stickiness was slightly reduced with addition of pectin in Comparative Example 2, but with the other polysaccharides there was no notable difference compared to Control Example 5.

Examples 15–18, Comparative Examples 5–8

Rice was cooked according to the method described below to determine whether any difference in yield increase was obtained by using the water-soluble hemicellulose as a solution in water and in different organic acids. In all of the examples, the moisture contents are the values measured at 30 minutes after cooking, taking 10 g of rice and drying it at 105° C. for 4 hours.

Example 15

Rice was cooked in exactly the same manner as Control Example 5, except that 12.8 g of a 15% aqueous solution of water-soluble hemicellulose (solution volume of 4.0% with respect to rice, 0.6% in terms of solid water-soluble hemicellulose) was added instead of the powdered water-soluble hemicellulose.

Example 16

Rice was cooked in exactly the same manner as Control Example 5, except that 12.8 g of a 15% aqueous solution of water-soluble hemicellulose containing 25% acetic acid (solution volume of 4.0% with respect to rice, 0.6% in terms of solid water-soluble hemicellulose) was added instead of the powdered water-soluble hemicellulose.

Example 17

Rice was cooked in exactly the same manner as Control Example 5, except that 12.8 g of a 15% aqueous solution of water-soluble hemicellulose containing 25% sodium acetate (solution volume of 4.0% with respect to rice, 0.6% in terms of solid water-soluble hemicellulose) was added instead of the powdered water-soluble hemicellulose.

Example 18

Rice was cooked in exactly the same manner as Control Example 5, except that 12.8 g of a 15% aqueous solution of water-soluble hemicellulose containing 25% lactic acid (solution volume of 4.0% with respect to rice, 0.6% in terms of solid water-soluble hemicellulose) was added instead of the powdered water-soluble hemicellulose.

Example 19

Rice was cooked in exactly the same manner as Control Example 5, except that 12.8 g of a 15% aqueous solution of water-soluble hemicellulose containing 25% citric acid (solution volume of 4.0% with respect to rice, 0.6% in terms of solid water-soluble hemicellulose) was added instead of the powdered water-soluble hemicellulose.

Comparative Example 5

Rice was cooked in exactly the same manner as Example 16, except that only 12.8 g of a 25% acetic acid solution was used, without addition of the water-soluble hemicellulose. The moisture content was measured using 10 g of rice taken 30 minutes after cooking.

Comparative Example 6

Rice was cooked in exactly the same manner as Example 17, except that only 12.8 g of a 25% sodium acetate solution was used, without addition of the water-soluble hemicellulose.

Comparative Example 7

Rice was cooked in exactly the same manner as Example 18, except that only 12.8 g of a 25% lactic acid solution was used, without addition of the water-soluble hemicellulose.

Comparative Example 8

Rice was cooked in exactly the same manner as Example 19, except that only 12.8 g of a 25% citric acid solution was used, without addition of the water-soluble hemicellulose.

The moisture contents and textures of the rice, and the shelf life after storage at 20° C. for 24 hours, are summarized in Table 9. The shelf life of the rice was determined based on whether the state of hardness, stickiness and appearance of the rice grains was maintained as immediately after cooking. This evaluation was based on Control Example 3 immediately after storage as reference, and the texture of the rice was indicated in order of quality by the symbols ⊚ (very good), ○ (good), Δ (slightly poor) and X (poor), also based on Control Example 3 as reference.

TABLE 9

Rice moisture contents and textures

| | Solid water-soluble hemicellulose added (wt % with respect to rice) | | | | | | | |
|---|---|---|---|---|---|---|---|---|
| | 0% | | | | 1.0% | | | |
| | Moisture (%) | Texture | Yield (%) | Shelf life | Moisture (%) | Texture | Yield (%) | Shelf life |
| Control Ex. 5 | 61.3 | X | 124 | X | | | | |
| Example 15 | | | | | 60.9 | ⊚ | 115.3 | ⊚ |
| Example 16 | | | | | 60.2 | ⊚ | 118.9 | ○ |
| Example 17 | | | | | 61.2 | ⊚ | 113.3 | ⊚ |
| Example 18 | | | | | 61.1 | ⊚ | 118.7 | ⊚ |
| Example 19 | | | | | 61.0 | ⊚ | 115.1 | ○ |
| Comp. Example 5 | | | | | 61.2 | X | 111 | X |
| Comp. Example 6 | | | | | 62.3 | X | 118 | X |
| Comp. Example 7 | | | | | 62.8 | X | 112 | X |
| Comp. Example 8 | | | | | 61.9 | X | 117 | X |

Note:
Yields shown are the yields after cooking, with 100% as the amount of rice obtained after cooking in Control Example 3.

The water-soluble hemicellulose had an effect of increasing yields even when used in solution form added to different acids (organic acids, etc.) and bases, while satisfactory shelf life was also confirmed. In contrast, when the different acids (organic acids, etc.) and bases which are known preservatives were used alone without addition of water-soluble hemicellulose, no effect of increased yield was obtained, and the shelf life was not improved.

Examples 20–21

Rice was cooked according to the method described below to determine differences in the quality of the rice with the passage of time upon storage at low temperature. Control Example 3 (same as Control Example 2) After adding 320 g of water to 320 g of soaked rice (an equivalent amount with respect to the rice), the rice was cooked using a domestic rice cooker (Micon Rice Cooker model ECJ-EA18, product of Sanyo Denki, KK.). A 100 g portion was divided out into a plastic container and wrapped to prevent drying, and then placed in an incubator at 10° C. or 20° C. for storage for 48 hours. The taste was periodically evaluated by organoleptic evaluation, and the taste values were measured using a rice cooker taste analyzer ("STA1A" by Satake Works, KK.).

For Control Examples 4 and 5 as well, 100 g of each was divided out into a plastic container in the same manner and wrapped to prevent drying, and then placed in an incubator at 10° C. or 20° C. for storage for 48 hours. The taste was periodically determined by organoleptic evaluation and measurement of the taste values in the same manner.

Example 20

Rice was cooked in exactly the same manner as Control Example 4, except that 3.2 g of water-soluble hemicellulose (1.0% with respect to the rice) was added to the water. A 100 g portion was divided out into a plastic container and wrapped to prevent drying, and then placed in an incubator at 10° C. or 20° C. for storage for 48 hours. The taste was periodically determined by organoleptic evaluation and measurement of the taste values in the same manner.

Example 21

Rice was cooked in exactly the same manner as Control Example 5, except that 3.2 g of water-soluble hemicellulose (1.0% with respect to the rice) was added to the water. A 100 g portion was divided out into a plastic container and wrapped to prevent drying, and then placed in an incubator at 10° C. or 20° C. for storage for 48 hours. The taste was periodically determined by organoleptic evaluation and measurement of the taste values in the same manner.

For Examples 11 and 13 as well, 100 g of each was divided out into a plastic container in the same manner after cooking and wrapped to prevent drying, and then placed in an incubator at 10° C. or 20° C. for storage for 48 hours. The taste was periodically determined by organoleptic evaluation and measurement of the taste values in the same manner.

The results of the organoleptic evaluation of the rice are summarized in Tables 10 and 11. The texture of the rice is indicated in order of quality by the symbols ⊚(very good), ○ (good), Δ (slightly poor) and X (poor), based on Control Example 3 as reference.

TABLE 10

Rice texture (organoleptic evaluation)

| Water added (comparative amount with respect to rice) | Water-soluble hemicellulose added (wt % with respect to rice) | | | | | | | | | | | | | | | | | |
|---|---|---|---|---|---|---|---|---|---|---|---|---|---|---|---|---|---|---|
| | 0% | | | | | | 0.5% | | | | | | 1.0% | | | | | |
| Storage temperature | 10° C. | | | 20° C. | | | 10° C. | | | 20° C. | | | 10° C. | | | 20° C. | | |
| Storage time(hrs) | 0 | 24 | 48 | 0 | 24 | 48 | 0 | 24 | 48 | 0 | 24 | 48 | 0 | 24 | 48 | 0 | 24 | 48 |
| Control Ex. 3 (1.0) | ⊙ | △ | X | ⊙ | ○ | △ | | | | | | | | | | | | |
| Control Ex. 4 (1.2) | ⊙ | ○ | X | ⊙ | ○ | △ | | | | | | | | | | | | |
| Control Ex. 5 (1.5) | ○ | X | X | ○ | X | X | | | | | | | | | | | | |
| Example 11 (1.2) | | | | | | | ⊙ | ○ | △ | ⊙ | ○ | ○ | | | | | | |
| Example 13 (1.5) | | | | | | | ⊙ | ○ | ○ | ⊙ | ⊙ | ○ | | | | | | |
| Example 20 (1.2) | | | | | | | | | | | | | ⊙ | ○ | ○ | ⊙ | ⊙ | ○ |
| Example 21 (1.5) | | | | | | | | | | | | | ⊙ | ⊙ | ○ | ⊙ | ⊙ | ○ |

The rice cooked with addition of soybean-derived hemicellulose retained a satisfactory texture without destruction and heavy sticking of the rice grains, even when the rice was cooked with water added at 1.5 times the amount of rice. On the other hand, the additive-free products became very sticky and lost their texture and flavor as rice when cooked with water added at 1.5 times the amount of rice.

The rice cooked with addition of soybean-derived hemicellulose underwent little loss of taste with time even when stored at 10° C. Moreover, while the additive-free products exhibited a dry texture when stored at 10° C. for 48 hours even with increased water during cooking, the hemicellulose-added rice remained sticky with no hardness.

TABLE 11

Rice texture (taste analyzer values)

| Water added (comparative amount with respect to rice) | Water-soluble hemicellulose added (wt % with respect to rice) | | | | | | | | | | | | | | | | | |
|---|---|---|---|---|---|---|---|---|---|---|---|---|---|---|---|---|---|---|
| | 0% | | | | | | 0.5% | | | | | | 1.0% | | | | | |
| Storage temperature | 10° C. | | | 20° C. | | | 10° C. | | | 20° C. | | | 10° C. | | | 20° C. | | |
| Storage time(hrs) | 0 | 24 | 48 | 0 | 24 | 48 | 0 | 24 | 48 | 0 | 24 | 48 | 0 | 24 | 48 | 0 | 24 | 48 |
| Control Ex. 3 (1.0) | 71 | 36 | 30 | 71 | 51 | 31 | | | | | | | | | | | | |
| Control Ex. 4 (1.2) | 73 | 37 | 32 | 73 | 58 | 34 | | | | | | | | | | | | |
| Control Ex. 5 (1.5) | 74 | 39 | 31 | 74 | 61 | 41 | | | | | | | | | | | | |
| Example 11 (1.2) | | | | | | | 72 | 59 | 48 | 72 | 66 | 59 | | | | | | |
| Example 13 (1.5) | | | | | | | 76 | 71 | 66 | 76 | 68 | 65 | | | | | | |
| Example 20 (1.2) | | | | | | | | | | | | | 74 | 61 | 49 | 74 | 66 | 61 |
| Example 21 (1.5) | | | | | | | | | | | | | 77 | 74 | 69 | 77 | 70 | 68 |

Note:
Taste analysis values are based on a total score of 100 points, with a higher score indicating better texture and taste.

As explained above, by soaking rice in water containing water-soluble hemicellulose during the soaking step for absorption of water prior to cooking of rice, or by adding powdered water-soluble hemicellulose to washed rice, mixing it for full coverage of the rice and then adding water for soaking, it is possible to reduce the required time for soaking and facilitate the preparation steps. In addition, the rice obtained by cooking this soaked rice underwent an effect of inhibited hardening from aging of the rice starch, and resistance to hardening even when stored in the low temperature range. This effect was more notable when the rice was cooked with the water added at about 10 to 25% with respect to the polished rice (about 5 to 20% with respect to the soaked rice) during cooking. According to the invention, preparation of soaked rice by addition of water-soluble hemicellulose to the water used for soaking, which results in more water included in the rice than conventional rice, also has the effect of providing improved yields of rice after cooking.

Furthermore, addition of water-soluble hemicellulose can also prevent heavy stickiness of the rice after cooking, and avoid crumbling of the rice grains, even when the amount of water used for cooking is increased.

This also results in improved yields of rice. In addition, rice which has been cooked with addition of water-soluble hemicellulose according to the invention also undergoes less deterioration of quality, including aging and hardening of the rice starch even when it is stored at low temperatures of 10° C. and below, the "chilled" temperature range, thus providing the effect of maintaining satisfactory texture over extended periods.

We claim:

1. A rice cooking method comprising the steps of:
   washing polished rice with water;
   soaking the washed rice in water; and,
   cooking the washed rice in water containing water-soluble hemicellulose in an amount such that the moisture content of the rice at 30 minutes after cooking is from 55 wt % to 75 wt % based on the dry weight of the polished rice.

2. The rice cooking method according to claim 1, wherein the amount of water-soluble hemicellulose added for the cooking is from 0.01 wt % to 10 wt % with respect to the dry weight of the rice.

3. The rice cooking method according to claim 1, wherein the soaking water is used for cooking.

4. The rice cooking method according to claim 1, wherein the water-soluble hemicellulose is derived from soybeans.

5. A rice cooking method comprising the steps of washing polished rice with water, soaking the washed rice in water containing water-soluble hemicellulose for a period of 25 minutes to 60 minutes, and cooking the soaked rice.

6. The rice cooking method according to claim 5, wherein the soaking water is used for cooking.

7. The rice cooking method according to claim 5, wherein the water-soluble hemicellulose is derived from soybeans.

8. The rice cooking method according to claim 5, wherein the amount of water-soluble hemicellulose added for the soaking is from 0.01 wt % to 10 wt % in terms of concentration in the soaking water.

\* \* \* \* \*